United States Patent [19]
Johnson et al.

[11] 4,342,507
[45] Aug. 3, 1982

[54] FLASH HOLDER ASSEMBLY ARRANGEMENT

[75] Inventors: Bruce K. Johnson, Andover; John B. Morse, Boston, both of Mass.

[73] Assignee: Polaroid Corporation, Cambridge, Mass.

[21] Appl. No.: 270,144

[22] Filed: Jun. 3, 1981

Related U.S. Application Data

[63] Continuation-in-part of Ser. No. 175,422, Aug. 5, 1980.

[51] Int. Cl.³ ............................................. G03B 15/03
[52] U.S. Cl. .................................................. 354/143
[58] Field of Search ........................................ 362/3-6, 362/11-18; 354/126, 129, 143, 144, 145, 288, 83, 86

[56] References Cited

U.S. PATENT DOCUMENTS

| | | | |
|---|---|---|---|
| 2,871,775 | 2/1959 | Van Der Mel | 354/126 |
| 3,670,639 | 6/1972 | Harnden | 354/144 X |
| 3,745,895 | 7/1973 | Brandt et al. | 354/143 X |
| 3,809,878 | 5/1974 | Brandt | 354/144 X |
| 3,979,762 | 9/1976 | Hendry et al. | 354/288 |
| 4,016,579 | 4/1977 | Lewis | 354/126 |
| 4,052,728 | 10/1977 | Hendry et al. | 354/86 |
| 4,106,037 | 8/1978 | Nakamura et al. | 354/145 X |
| 4,132,471 | 1/1979 | Svatek et al. | 354/86 |
| 4,168,895 | 9/1979 | Pizzuti | 354/288 X |
| 4,231,645 | 11/1980 | Davis et al. | 354/145 |

FOREIGN PATENT DOCUMENTS

| | | | |
|---|---|---|---|
| V 8116 | 2/1956 | Fed. Rep. of Germany | 354/126 |
| 2715654 | 10/1978 | Fed. Rep. of Germany | 354/145 |

Primary Examiner—Donald A. Griffin
Attorney, Agent, or Firm—David R. Thornton

[57] ABSTRACT

A foldable flash holder comprised of three integrally molded plastic parts interconnected exclusively by snap fit. One of the parts is a contact retainer which includes an elongated receptacle well for receiving a multi-bulb flash array and a contact retaining bracket formation holding a plurality of U-shaped contacts uniformly spaced with one another, with one end of each contact cantilevered in position for resilient engagement with a contact blade portion of the flash array, while the opposite end of each contact is held in engagement with a flexible power cable. One embodiment of the flash holder includes an actuator movable in response to engagement by the flash array to actuate a mechanism in the associated camera which places the camera in an artificial illumination mode.

24 Claims, 18 Drawing Figures

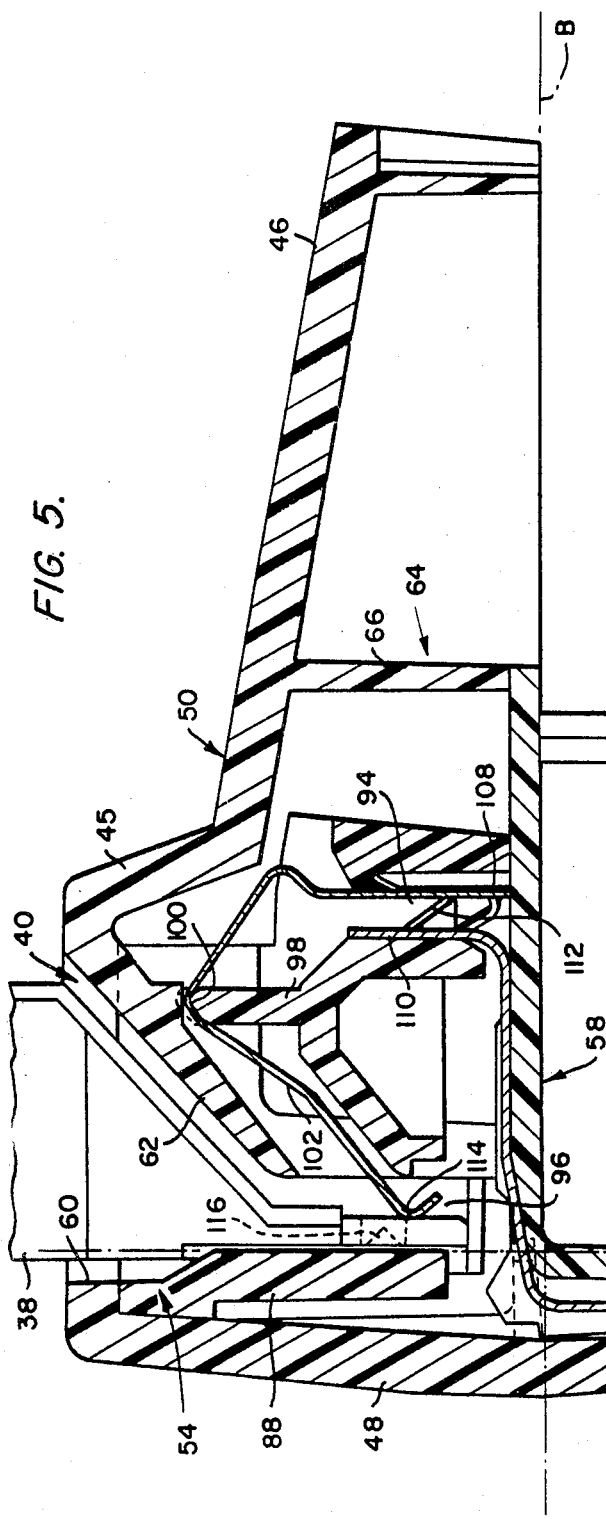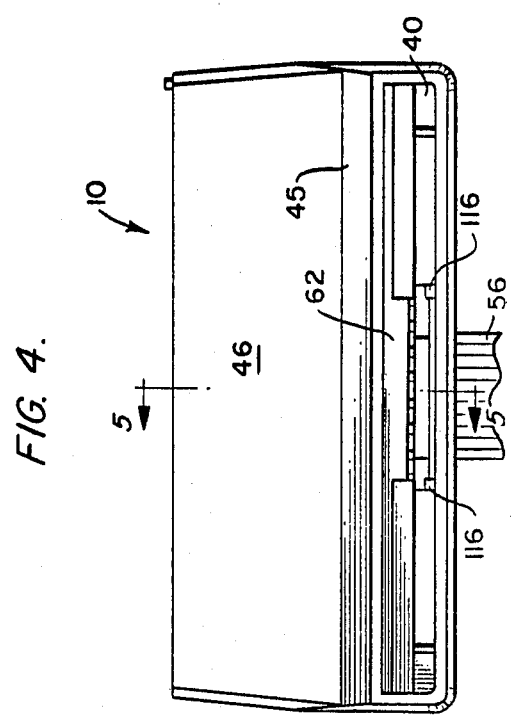

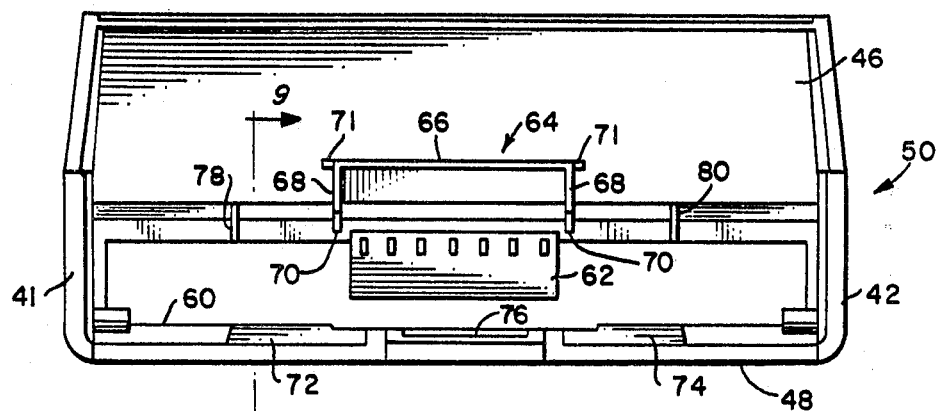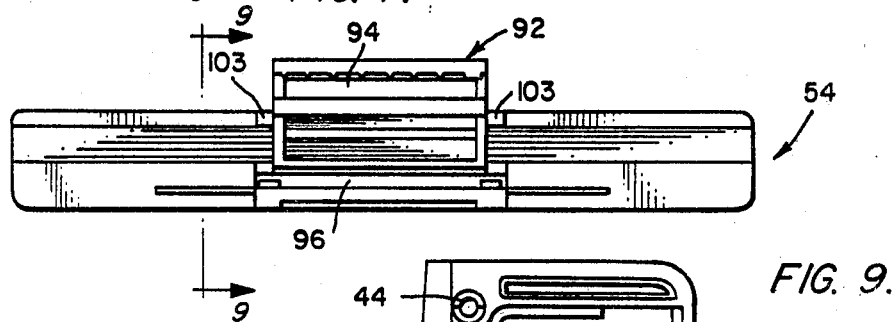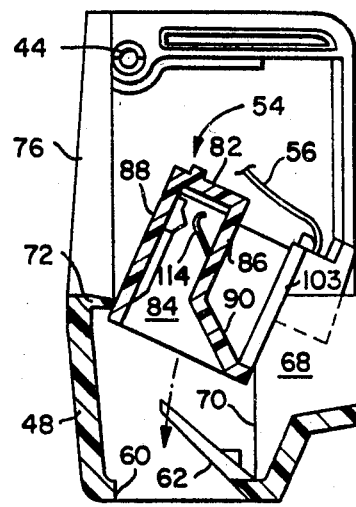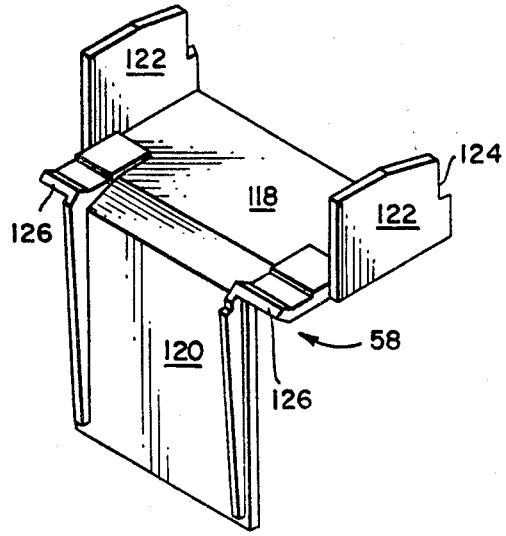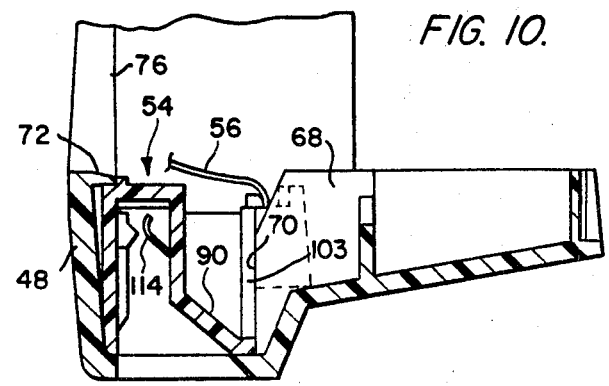

FLASH HOLDER ASSEMBLY ARRANGEMENT

CROSS-REFERENCE TO RELATED APPLICATION

This application is a continuation-in-part of Ser. No. 175,422 filed Aug. 5, 1980.

BACKGROUND OF THE INVENTION

This invention relates to photographic equipment and more particularly, it concerns a folding flash holder assembly for cameras.

Commonly assigned copending applications Ser. No. 054,598, filed July 3, 1979, by Bruce K. Johnson, now issued as U.S. Pat. No. 4,268,146, and Ser. No. 054,652, filed July 3, 1979, by Carl W. Davis and Joseph E. Murray, Jr., now issued as U.S. Pat. No. 4,231,645, disclose camera and foldable flash unit arrangements in which the flash unit is movable as part of the camera between an operative erect position and a folded storage position. In the erect position, working exterior components of both the camera (e.g., the objective lens, view finder, range finder and photometer) and the flash unit (e.g., the source of illumination) are conditioned in the conventional forwardly facing orientation for exposure of film carried in the camera. In the folded position, the flash unit fits into a complementing formation of the camera housing in a manner such that the same working components are completely enclosed by exterior casing portions of the camera and of the flash unit. As a result, not only is the use of flash illumination facilitated by simple movement of the flash unit to the erect position, but also the need for auxiliary casings and the like to protect sensitive camera components during storage and handling is completely avoided.

The arrangements disclosed in the aforementioned copending applications are particularly suited for electronic flash units in which the source of illumination is permanently contained in the flash unit housing and presented at a window in a unit housing face which moves against the camera housing when the unit is moved to the folded position. As compared with cameras equipped with disposable flash bulbs or plural flash bulb arrays, cameras equipped with a folding or otherwise "built-in" electronic flash unit entail manufacturing costs which are reflected in a higher overall camera price. In order to make available a variably priced family of cameras related in terms of structural geometry and capable of using the same film, therefore, there is a need for low-cost cameras in which a source of flash illumination is accommodated simply by a receptacle in the camera and into which a disposable flash bulb or flash bulb unit may be inserted. Although such receptacles or flash holders traditionally have been incorporated in the camera housing, the folding flash unit geometry of the aformentioned copending applications has many advantages such as providing a protective enclosure for delicate camera components as mentioned. In addition, the adaptation of the folding flash unit housing as a flash bulb holder facilitates the standardization of low-cost electronic components and as well serves to displace the source of disposable flash bulb illumination away from the objective lens axis of the camera. In keeping with the principal objective of low manufacturing costs, however, it is important that the foldable flash holder, representing an additional adjunct as compared with the conventional camera housing receptacle, be capable of low-cost unit assembly and unit/camera assembly.

Associated with the use of disposable flash bulb units, the receptacle in the flash holder which receives the flash bulb units should ease unit insertion and removal, while providing positive retention of the flash bulb units and reliable electrical engagement between the flash bulb units and a power source when the flash bulb units are in position in the receptacle. In addition, the foldable flash holder may require a mechanism for actuating the follow-focus capability of some cameras to accommodate a mode of operation compatible with an artificial light source.

SUMMARY OF THE INVENTION

In accordance with the present invention, a highly effective folding flash holder is provided to serve both as an electric receptacle and mounting for a disposable, multi-bulb flash array and as a cover or closure for protecting delicate components of a camera fitted with the holder. The flash array receptacle is formed on the exterior of a pivotal holder housing shaped to complement the front exterior portion of the camera housing so that when moved to a folded or closed position, it completely encloses the camera lens, view finder lens and other such components presented at the front of the camera. When unfolded or opened to an erect position, a flash array received in the holder receptacle is oriented to direct flash illumination forwardly of the camera and so that the source of such illumination is spaced substantially from the optical axis of the camera lens.

The folding flash holder attaches to the camera by snap fit and is, moreover, constituted as a snap or press fit assembly of only five components of which two such components are an electrical contact array and one end of an electric cable. The remainder of the flash holder consists of three molded plastic components which not only fit together in a way to secure the entire flash unit assembly, but also in a way which facilitates manufacturing assembly without special tools or assembly jigs. Thus, the advantages of foldability in a flash holder are obtained while at the same time, manufacturing costs are kept consistent with conventional camera housing mounted receptacles for disposable flash bulb arrays.

One of the molded plastic components is a contact retainer which includes an elongated receptacle well for receiving the flash array and a contact retaining bracket formation for receiving the U-shaped contacts of the electrical contact array. The contact retaining bracket formation also maintains the individual contacts in uniformly spaced positions, and supports the contacts so that one end of each contact is cantilevered in position for resilient engagement with a contact blade portion of the flash array. The contact retaining bracket formation includes slots for receiving the end portions of the U-shaped contacts in a straight linear motion, and a support rail for supporting the central portions of the contacts so that one end of each contact will be cantilevered and maintained in a position in the elongated receptacle well, in which it engages the flash array. The contact retainer also includes surfaces defining structure for maintaining the individual contacts uniformly spaced. In one embodiment of the flash holder, an elongated actuator is retained in the flash holder and is adapted to move, due to engagement with a flash array being inserted in the receptacle well, to a position in which it extends from the flash holder to actuate a mechanism in the associated camera which places the camera in a flash mode of operation, which is especially adapted for use with artificial illumination.

Among the objects of the present invention are, therefore: the provision of an improved foldable flash holder for cameras; the provision of such a holder which serves to receive a disposable flash bulb array and an electrical contact assembly in a straight line motion, and to maintain the individual electrical contacts uniformly spaced in resilient engagement with the flash bulb array; and which includes an actuator for placing the camera in a flash mode of operation for use with artificial illumination.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 4 is a top plan view of the flash holder in its erect position as viewed from the top and rear of the camera;

FIG. 5 is an enlarged vertical cross section on line 5—5 of FIG. 4;

FIG. 6 is a bottom plan view of a hood component of the flash holder;

FIG. 7 is a bottom plan view of a contact retainer component of the flash holder;

FIG. 8 is a perspective view illustrating the bottom of an underhousing component of the flash holder;

FIG. 9 is a cross section on lines 9—9 of FIGS. 6 and 7, respectively, illustrating assembly of the components shown in those figures;

FIG. 10 is a fragmentary cross section similar to FIG. 9 but showing a completed assembly of the components illustrated in FIGS. 6 and 7;

DETAILED DESCRIPTION OF THE PREFERRED EMBODIMENTS

Figure 1:
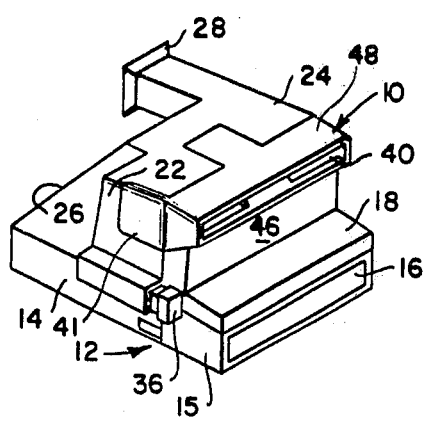
FIG. 1 is a perspective view of a camera including the folding flash holder of the present invention shown in the folded position.
Figure 2:
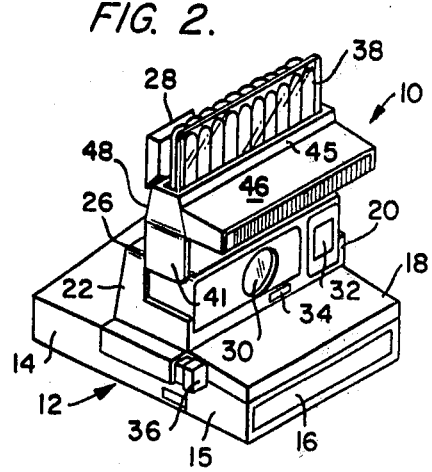
FIG. 2 is a similar view but includes a flash array and illustrates the flash holder in an erect position.

In the accompanying drawings, the flash holder of the present invention is generally designated by the reference numeral 10 and in FIGS. 1 and 2, is shown assembled with a camera 12. Although many features of the flash holder 10 to be described are adaptable to cameras other than the camera illustrated in FIGS. 1 and 2, a brief description of the camera 12 to which the holder 10 is particularly suited for use will facilitate an appreciation of certain structural and functional characteristics of the present invention.

The camera 12 is of a well known general class of instant or self-developing cameras and, as such, includes a base section 14 having a latched pivotal door housing 15 through which a pack of film units may be loaded into the base section. Also as is well known, individual film units are discharged through an opening 16 in the door housing after exposure. The upper front portion of the camera housing overlying the door housing is defined on its exterior by an apron 18 which extends rearwardly to a forwardly facing lens mount wall 20 which as shown in FIG. 2, is in the nature of a vertical front face on the exterior housing of the camera 12. The wall 20 joins with a pair of sidewalls 22 and a top wall 24, the latter joining with an inclined rear wall 26 to form an interior exposure chamber. Also, the top wall 24 extends rearwardly to a view finder eyepiece 28 as shown in FIG. 1.

Presented in the front face 20 are various exterior optical components of the camera including an objective lens 30 and a view finder lens 32. In addition, a photocell window 34 may be provided in the front face 20 assuming the camera to be equipped with an automatic exposure control system. In the disclosed camera, an actuating button 36 is shown displaced laterally of the lens mount wall 20 at the juncture of the sidewall 22 with the base section 14.

As implied by the alternative positions illustrated in FIGS. 1 and 2, the flash holder 10 is positively supported from the camera 12, specifically the sidewalls 22 thereof, for movement between a folded or closed position as shown in FIG. 1 to an unfolded or erect position as shown in FIG. 2. Inasmuch as the primary function of the holder 10 is to receive and support a disposable flash bulb unit, in this instance, an elongated multi-bulb flash array 38, the holder 10 is provided with an elongated receptacle well 40 which will be described in more detail below but which generally complements the array 38 to mechanically retain the array and also to electrically connect the flash array 38 with a power supply and switching components (not shown) within the housing of the camera 12.

As may be seen by reference to FIGS. 2 and 5 of the drawings, the overall geometric configuration of the flash holder 10 may be related to a pair of mutually orthogonal reference planes, that is, a first reference plane A and a second reference plane B. Thus, a pair of sidewalls 41 and 42 which are perpendicular to both reference planes A and B, extend in one direction from the reference plane B and carry inwardly projecting pintle formations 44 to establish a pivotal axis in the plane A spaced from and parallel to the reference plane B. A cover portion 46 projects forwardly of the first reference plane A on the side of the plane B opposite to the side thereof from which the sidewalls extend. The receptacle well 40 is located in a rail or rail-like formation 45 between the reference plane A and the hood portion 46. Finally, the rail formation 45 joins with a rear wall portion 48 which is spaced slightly to the rear of the reference plane A.

Figure 3:
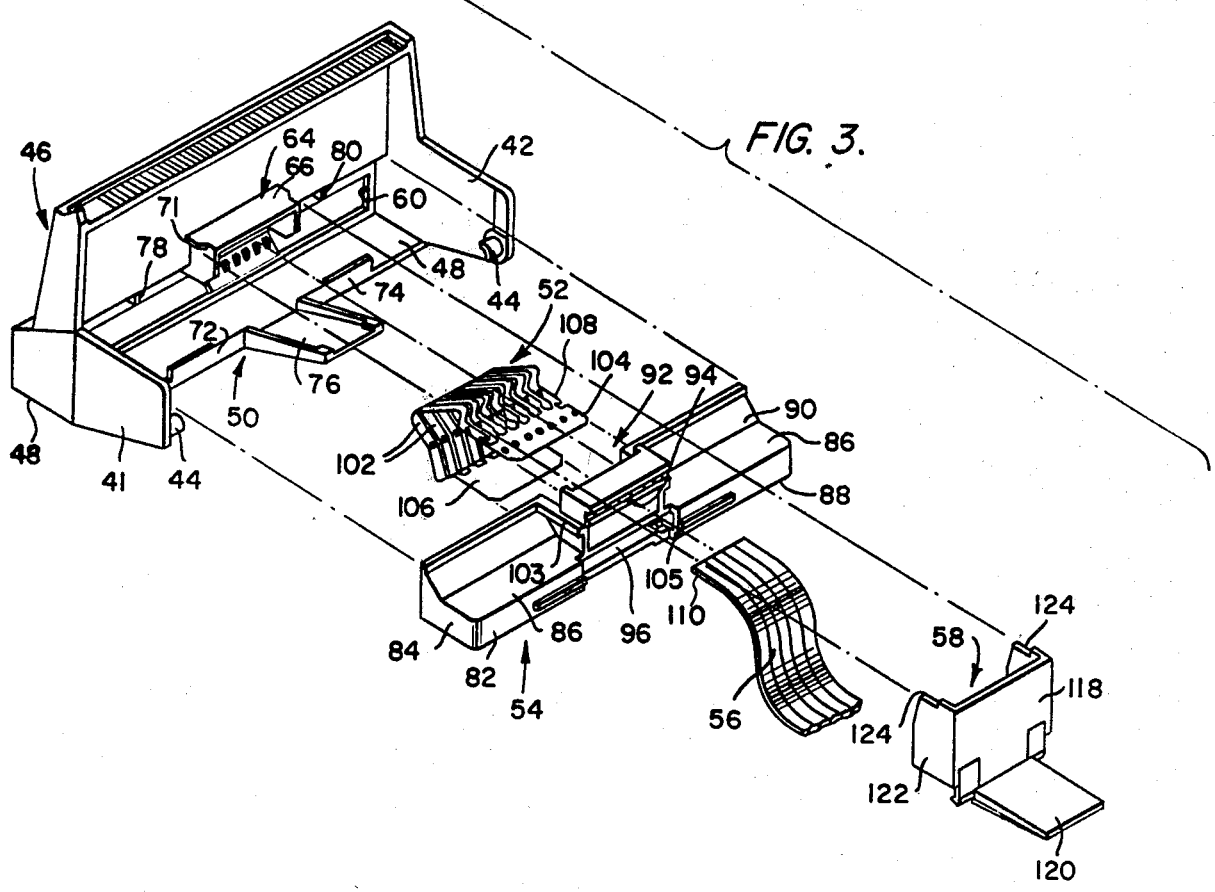
FIG. 3 is an exploded perspective view of the flash holder rotated 180° counter clockwise from its position in FIG. 1 so as to illustrate its respective components.

In FIG. 3 of the drawings, wherein the holder 10 is rotated 90° counter clockwise from the position shown in FIGS. 2 and 5, individual components of the holder are shown most clearly to include a hood component 50, a contact assembly 52, a contact retainer 54, a multiconductor ribbon-like power cable 56 and an underhousing component 58. While the structure of the individual components illustrated in FIG. 3 and their assembly to form the holder 10 will be described in more detail, it will be noted from FIG. 3 that the hood component 50 is an integral molding of a suitable synthetic resinous material shaped to provide the previously described sidewalls 41 and 42, rail formation 45, cover portion 46 and the rear wall 48. The hood 50, moreover, provides a basic supporting structure for all other components of the holder 10.

As is shown most clearly in FIGS. 3, 5, 6 and 9 of the drawings, the receptacle well 40 is defined in substantial part by the contact retainer 54 and to a minor extent by the rail formation 45 in the hood 50 in the sense that the latter establishes a peripheral rectangular mouth 60 and a foreshortened centrally-disposed inclined wall portion 62 (see FIGS. 5 and 9). In relation to the aforementioned reference planes A and B, the wall portion 62 extends from the front edge of the receptacle well 40 at an inclination which is equiangular to both reference planes. Depending from the interior of the cover portion 46 is a rectangular bracket formation 64 having a front wall 66 and a pair of sidewalls 68 (see FIG. 6) the latter terminating in a free-standing and chamfered rear edge 70. Also the front wall 66 extends beyond the sidewalls 68 as foreshortened abutments 71 (FIGS. 3 and 6). The rear edge surfaces 70 of the bracket formation together with the back wall portion 48 and the sidewalls 41 and 42 define an elongated chamber in the interior of the hood 50 generally underlying the receptacle well mouth 60. Also in this respect, as can be seen in FIGS. 3 and 6, the back wall 48, which forms an integral part of the hood 50, terminates at its lower free end or edge in a pair of ledges 72 and 74 spaced on opposite sides of a central cable duct formation 76. The chamber thus established is further delimited by a pair of vertical rib formations 78 and 80 projecting from the interior of the cover formation forwardly of the receptacle well mouth 60.

As may be seen by reference to FIGS. 3, 5, and 9 of the drawings, for example, the contact retainer 54 is also an integral molding of synthetic resinous material shaped to provide a generally trough-shaped structure having a bottom wall 82, a pair of end walls 84, a front wall 86 and a back wall 88. The front wall 86 joins with an upwardly and outwardly flared wall portion 90 which lies substantially flush with the inclined central wall portion 62 of the hood component to define the interior forward configuration of the receptacle 40. Centrally along the length of the contact retainer 54 is a contact retaining bracket formation 92 to define a forward slot 94 and with the back wall 88 a rear slot 96. Between the slots 94 and 96, the bracket formation 92 defines a contact supporting rail 98 having channel-like formations 100 to separate respective contact blades 102 of the contact assembly 52. As shown most clearly in FIGS. 3, 7 and 9, a pair of guide rails 103 project from each side of the contact retaining bracket formation 92.

Also the bottom wall 82 is cut away to provide a control notch 105 in the region of the rear slot 96 (FIG. 3).

As shown most clearly in FIGS. 3 and 5, the contact assembly 52 is initially formed as an integral, generally U-shaped stamping with a pair of breakaway tabs 104 and 106. The tabs 104 and 106 facilitate direct insertion of the contact assembly 52 into the slots 94 and 96 and so that the central bent portion of the individual contact blades 102 rests on the support rail 98. Also with respect to the contacts, after the assembly 52 is inserted into the retainer 54 and the tabs 104 and 106 removed, the contacts 102 are positioned as shown most clearly in FIG. 5. Specifically, a connecting end 108 of each contact is positioned in the slot 94 and capable of making sound electrical contact with an end 110 of the cable 56 inserted into the slot 94 against an inclined tab 112 on each contact blade 102. The other or free end of each contact blade 102 extends into the opening 96 as a spring biased terminal 114 located in a position to engage respective contacts on the flash bulb array 38 when it is inserted into the receptacle. The contact terminal ends 114 of the blades additionally bias the base of the flash array 38 against retaining lugs 116 projecting from the back wall 88 of the contact retainer 54.

The underhousing 58 serves to complete an enclosure of the contacts 102 as well as the cable 56 in a manner facilitating assembly and positioning of the cable 56. As shown most clearly in FIGS. 3 and 8 of the drawings, the underhousing is of generally L-shaped cross-sectional configuration to provide a base wall 118 from which a cable cover portion 120 depends at right angles. The base wall 118 is provided with a pair of upstanding sidewalls 122 having a notch 124 in the front edge thereof. A pair of cross-sectionally tapered or V-shaped detent formations 126 porject rearwardly from the wall 118 between the sidewalls 122 and the cable cover portion 120.

In the assembly of the components illustrated in FIG. 3 to provide the complete flash holder 10, the contact assembly 52 and cable end 110 are first placed into the contact retaining component 54 in the manner described. Thereafter the contact retainer including the contacts 102 and cable 56 are inserted as a unit into the hood 50 as shown most clearly in FIGS. 9 and 10 of the drawings. Specifically, the guide rails 103 on the contact retaining bracket formation 92 rest against a chamfer on the rear edges 70 of the bracket formation 64. The back wall 88 of the contact retainer 54, at this point, engages with the ledges 72 and 74 projecting from the back wall 48 of the hood component 50. By pushing the contact retainer 54 into the elongated cavity defined by the hood 5, the contact retainer will come to rest in the position illustrated in FIG. 10. In particular, the ledges 72 and 74 will snap over the bottom wall 82 of the contact retainer. Thus, the contact retainer 54 is captured between the rear wall 48 and the rear edges 70 of the bracket formation 64, and between the ledges 72, 74 and the inside of the rail formation 45, all integral portions of the hood 50.

Figure 11:
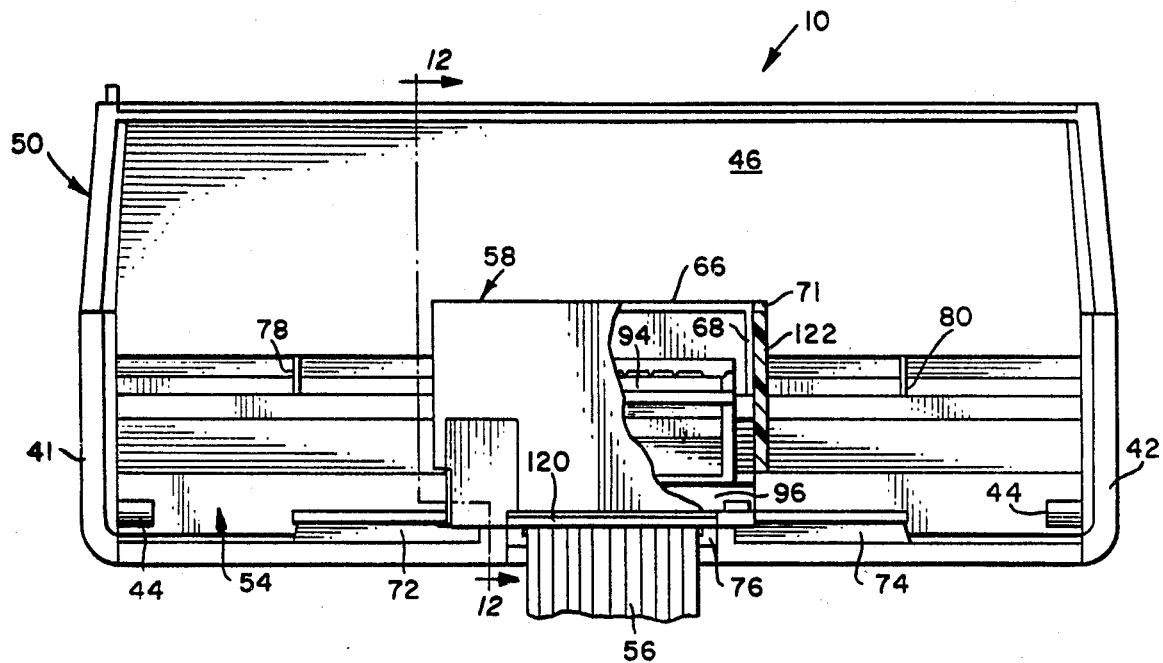
FIG. 11 is a bottom plan view of the assembled flash holder.
Figure 12:
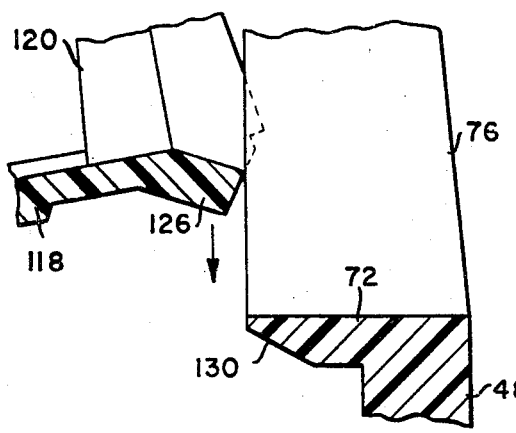
FIG. 12 is an enlarged fragmentary cross section on line 12—12 of FIG. 11 illustrating assembly of components shown in that figure.
Figure 13:
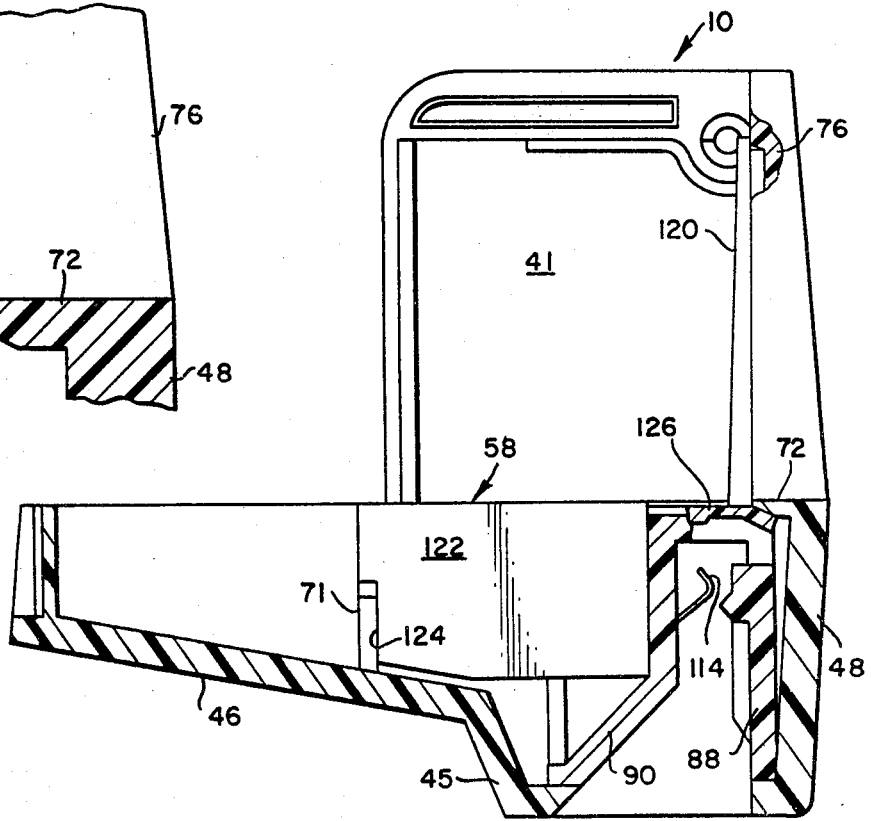
FIG. 13 is an enlarged cross section on line 12—12 of FIG. 11 illustrating the components of FIG. 12 in a fully assembled condition.

Since the cable 56 will extend freely from the opening 94 in the contact retainer 54 after assembly of the contact retainer 54 with the hood 50, the underhousing 58 is mounted in a manner to fold the cable rearwardly (see FIG. 5) and enclose the same between the central cable duct formation 76 on the hood and the cable cover formation 120 of the underhousing 58. As shown in FIGS. 12 and 13, therefore, the underhousing is inserted by placing the notches 124 against the abutments 71 on the bracket formation 64 of the hood and pivoting it toward and into the notch 105 in the base of the contact retainer 54 until the detent formations 126 snap under a chamfered formation 130 in the ledges 72 and 74 (FIG. 12). The completely assembled inner housing is shown in FIGS. 5, 11 and 13.

When the assembly of the holder 10 is completed, it is attached to the camera 12 simply by snapping the pintles 44 over the sidewalls 22 into appropriate apertures (not shown) in the camera housing sidewalls. Thereafter, the holder may be pivoted from the collapsed position shown in FIG. 1 to the erect position shown in FIG. 2, loaded with a flash bulb array 38 and is ready for use. Closure of the holder 10 from the position shown in FIG. 2 to the closed position of FIG. 1 may occur either with or without removal of the flash bulb array 38.

Figure 14:
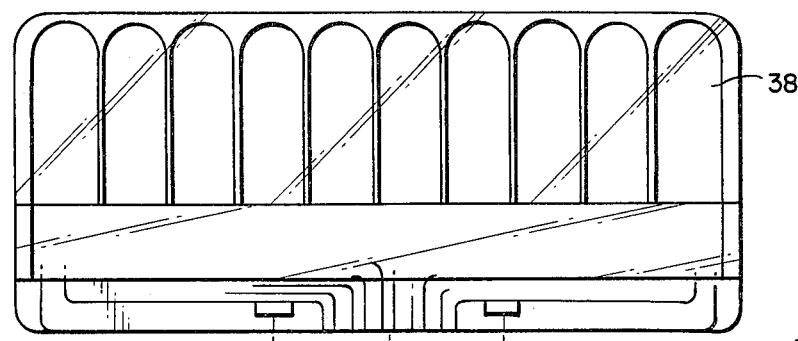
FIG. 14 is a front elevational view of an alternate form of the flash holder of the present invention shown in an erect position, and a flash array oriented for insertion into the holder.
Figure 15:
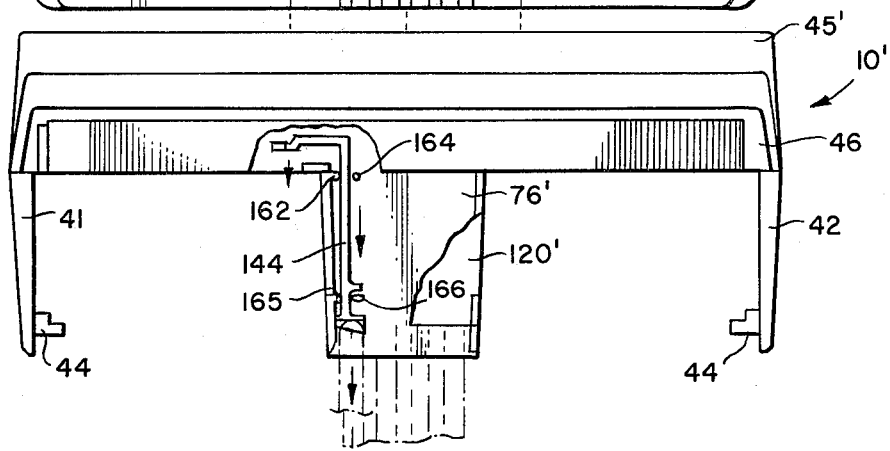
FIG. 15 is a top plan view of the flash holder of FIG. 14.

In an alternate embodiment of the present invention, as illustrated in FIGS. 14 and 15, a flash holder 10' includes most of the structural elements of the previously described embodiment. The flash holder 10' includes the pair of side walls 41 and 42, the inwardly projecting pintle formations 44, and the cover portion 46. The receptacle well 40 is located in a rail formation 45', which differs from the rail formation of the first embodiment in that it does not include a foreshortened centrally-disposed inclined wall portion like the wall portion 62. The rail formation 45' joins with the rear wall portion 48.

Figure 16:
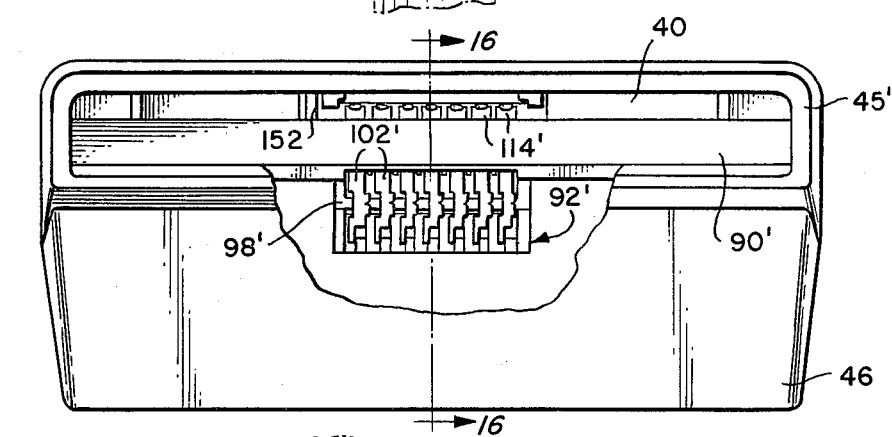
FIG. 16 is a cross section on line 16—16 of FIG. 15.

As can be seen from FIG. 16, the holder 10' includes a hood component 50', a contact retainer 54' and an underhousing component 58'. The receptacle well 40 is defined in substantial part by the contact retainer 54' and to a minor extent by the rail formation 45' in the sense that the latter establishes a peripheral rectangular mouth 60.

Figure 17:
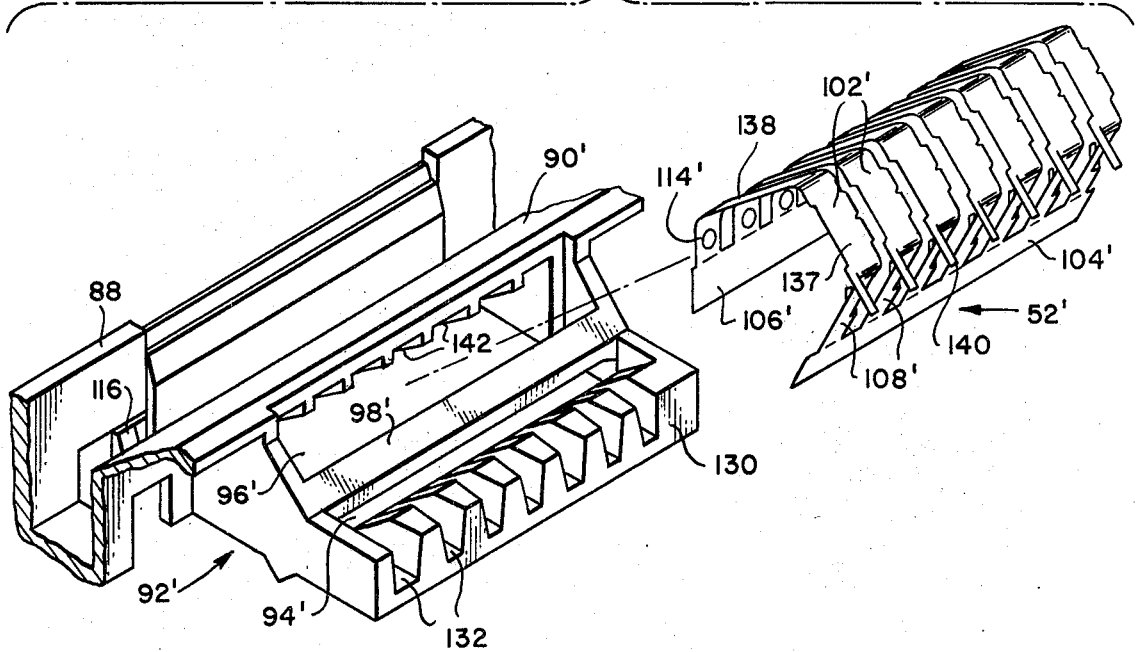
FIG. 17 is a perspective view of a contact retainer component of the flash holder of FIG. 14 and a contact assembly oriented for insertion into the contact retainer component.

As may be seen by reference to FIGS. 16 and 17, the contact retainer 54' has a generally trough-shaped structure having the bottom wall 82, the pair of end walls 84, the front wall 86 and the back wall 88 disclosed for the first embodiment and illustrated in FIGS. 3 and 5. The front wall 86 joins with an upwardly and outwardly flared wall portion 90' which defines the entire interior forward support surface for supporting the flash array 38. This differs from the first embodiment in which the inclined central wall portion 62 of the hood component defines the central portion of the support surface.

Centrally along the length of the contact retainer 54' is a contact retaining bracket formation 92' which defines a forward slot 94' and a rear slot 96'. Between the slots 94' and 96', the bracket formation 92' defines a contact supporting rail 98'. On the forward side of the forward slot 94' is an elongated bar 130, which extends parallel to the support rail 98' and defines a plurality of evenly spaced vertical slots 132 which have open upper ends and closed lower ends. The outwardly flared wall portion 90' has a lower internal surface 134 which defines the rear boundary of the rear slot 96'. A plurality of evenly spaced ribs protrude from the lower internal surface 134 to define channels 136 which are in alignment with the slots 132. A rear surface 136 of the elongated bar 130 defines one boundary of the forward slot 94' and lies parallel to the lower internal surface 134 of the outwardly flared wall portion 90'. The support rail 98' is closer to the rear surface 136 than to the lower internal surface 134.

As shown in FIG. 17, the contact assembly 52' is initially formed as an integral, generally U-shaped stamping with a pair of breakaway tabs 104' and 106'. Each of the contact blades 102' has a connecting end 108', a central portion 137 and a free end 138 terminating in a spring-biased terminal 114'. The tabs 104' and 106' facilitate direct insertion of the contact assembly 52' into the slots 94' and 96' so that the central portions 137 of the individual contact blades 102' rest on the support rail 98'. The fact that the lower surface 134 and the rear surface 136 are parallel permits the contact assembly 52' to be inserted in a straight linear motion. As is best shown in FIG. 16, the connecting end 108' of each contact is positioned in the slot 94' and is capable of making positive electrical contact with an end 110 of the cable 56 inserted into the slot 94' against the inclined tab 112' on each contact blade 102'. The support rail 98' engages the central portion 137 closer to the connecting end 108' than to the free end 138, so that a long resilient lever arm is defined between the support rail 98' and the spring biased terminal 114' located at the free end 138 of each contact blade 102. The spring-biased terminals 114' are located in a position to engage respective contacts on the flash bulb array 38 when it is inserted into the receptacle, and the long lever arm permits a relatively easy insertion and removal of the flash bulb array 38. The terminals 114 also bias the base of the flash array 38, which contains apertures, against retaining lugs 116, which project from the back wall 88 of the contact retainer 54' into the apertures in the same manner as shown in FIG. 5 for the first embodiment.

Each of the contact blades 102' includes a narrow tine 140 integral and coplanar with the central portion 137, and projecting from the end of the central portion 137 adjacent to the connecting end 108 beyond the connecting end 108 and into one of the slots 132 defined in the elongated bar 130. The reception of the tines 140 in the slots 132 helps maintain the contact blades 102' in evenly spaced positions.

A plurality of uniformly spaced ribs are defined on the lower internal surface 134 of the outwardly flared wall portion 90' to define channels 142 which are in alignment with respective slots 132, and which provide seats to maintain the free ends 138 in evenly spaced positions, corresponding to the spacing of the tines 140 adjacent the connecting ends 108'.

Figure 18:
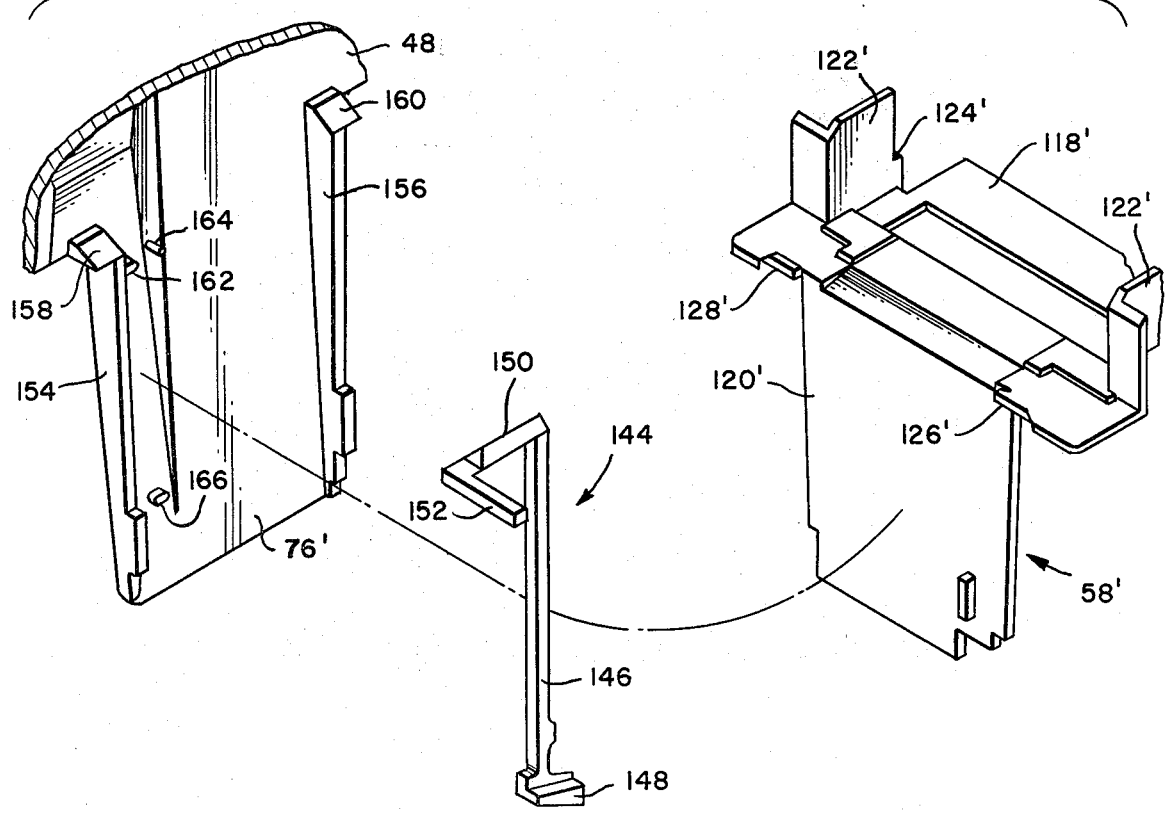
FIG. 18 is a perspective view of a central cable duct formation of the flash holder of FIG. 14, an actuator and an underhousing component therefor prior to assembly.

As best illustrated in FIGS. 14 and 18, the holder 10' according to the alternate embodiment of the invention includes an actuator 144 retained between a central cable duct formation 76', which is integrally formed with the lower free end or edge of the back wall 48, and a cable cover portion 120' of an underhousing 58'.

The actuator 144 includes a slender shank 146 having at one end thereof a bevelled pad 148 for engaging a control member (not shown) in a camera having a variable aperture mechanism. The control member operates in the flash mode to select a maximum aperture which is especially suited for artificial illumination. The operation of such a control member is described in U.S. Pat. No. 4,104,653 to Bruce K. Johnson and George D. Whiteside and assigned to the assignee of the present application. The other end of the shank 146 terminates in an arm 150 extending laterally therefrom at a right angle thereto. The free end of the arm 150 includes a yieldable contact pin 152 extending orthogonal to the plane defined by the shank 146 and the arm 150.

The central cable duct formation 76' includes lateral flanges 154 and 156 projecting forward from its lateral edges. Extending forward from the formation 76' and laterally from the lateral flanges 154 and 156 are retantion lugs 158 and 160, respectively, which are chamfered to allow mating formations on the underhousing component 58' to snap thereover. A rib 162 is defined on the inner surface of the lateral flange 154, and a post 164 protrudes forward from the central cable duct formation 76' at a position spaced slightly toward the center of the formation 76' from the rib 162, thereby forming a passage in which the shank 146 is received. A similar rib 165 (FIG. 14) is defined on the inner side of the lateral flange 154 near the lower end thereof and forms a similar passage with a post 166 projecting rearwardly from the central cable duct formation 76' at a position spaced slightly inward from the lower rib to define a second passage in alignment with the upper passage for receiving a lower end of the shank 146. The lateral arm 150 engages the back wall 48 above the retaining lug 158, so that the contact pin 152 traverses the receptacle well 40 at the lower end thereof, adjacent to the terminals 114' of the contact blades 102'.

The underhousing 58' coacts with the central cable duct formation 76' to enclose the actuator 144, as well as the cable 56, and further to coact with the rectangular bracket formation 64 to enclose the contacts 102', in the same manner that the contacts 102 are enclosed in the first embodiment. The underhousing 58' is of generally L-shaped cross-sectional configuration to provide a base wall 118' from which a cable cover portion 120' depends at right angles. The base wall 118' is provided with a pair of upstanding side walls 122' having a notch 124' in the front edge thereof. A pair of detent formations 126' project rearwardly from the wall 118' between the side walls 122' and are offset above the wall 118' so that the bevelled lugs 158 and 160 may snap thereunder when the underhousing 58' is assembled with the central cable duct formation 76'.

As can best be seen from FIG. 14, when the flash array 38 is inserted into the elongated receptacle well 40, a lower blade portion of the array 38 will engage the contact pin 152 of the actuator 144, thereby urging the actuator 144 downward so that the bevelled pad 148 moves to a position (shown dotted) just below the lower edge of the cable cover portion 120 to thereby displace the control member in the associated camera when the flash holder 10' is in its erect position similar to that depicted in FIG. 2.

The control member (not shown) in the camera is biased upwardly so that when the holder is erect without a flashbar, the actuator is held in a raised position as shown in FIG. 14. Insertion of the flashbar then operates against the yieldable contact pin 152 to force the actuator downwardly against the bias of the control member. Additionally, lug 166 which defines the actuator channel, also operates as a stop to limit the extension of the actuator when the holder 10' is in the folded configuration of FIG. 1 thereby eliminating any interference of the actuator during pivoting of the holder to its erect position.

Thus it will be seen that as a result of the present invention, an extremely effective flash holder assembly is provided by which the above-mentioned objectives are completely fulfilled. Also it will be apparent to those skilled in the art from the preceding description that modifications and/or changes may be made in the disclosed embodiment without departure from the present invention. Accordingly, it is expressly intended that the foregoing description and accompanying drawings are illustrative of a preferred embodiment only, not limiting, and that the true spirit and scope of the present invention is to be determined by reference to the appended claims.

What is claimed is:

1. A flash socket assembly comprising:
    a plurality of generally U-shaped electrical contacts each having first and second end portions, each of said second end portions of said electrical contacts including an inclined tab;
    a flexible cable; and
    a contact retainer of unitary molded construction having an opening therein for receiving at least the contact blade portion of a flash array, said retainer having a support surface positioned to support one side of the contact blade when the contact blade is operatively positioned within said opening, and means for effecting electrical contact between said second end portions of said U-shaped electrical contacts and a first end of said flexible cable, said electrical contact effecting means including a first internal surface of said retainer against which said second end portions of said U-shaped electrical contacts are seated and a second internal surface of said retainer disposed in facing relation to said first internal surface thereof and against which said first end of said flexible cable is resiliently engaged by said inclined tabs.

2. The assembly of claim 1 additionally including a generally L-shaped underhousing releasably attached thereto, said underhousing including a base wall extending in the general direction of said cover portion of said hood to cooperate therewith to enclose said retainer and a cable portion extending in the general direction of said rear wall portion of said hood, said flexible cable extending from said second end portion of said U-shaped electrical contacts between said base portion of said L-shaped underhousing and said retainer, then extending between said cable cover wall portion of said L-shaped underhousing and said rear wall portion of said hood in the direction of said end of said rear wall portion configured to be pivotally attached to the camera, the second end of said flexible cable extending from said assembly for connection to the camera.

3. The assembly of claim 2 wherein said L-shaped underhousing is releasably attached to the assembly of said retainer and said hood in a snap-fit manner.

4. A foldable flash holder for a camera having an exterior housing to define a forwardly facing lens mount wall, said flash holder comprising:
    a hood having, in relation to first and second orthogonal reference planes, pivotal mounting means on an axis lying in said first reference plane and in parallel spaced relation on one side of said second reference plane, a cover portion projecting forwardly of said first reference plane on the other side of said second reference plane, a back wall portion positioned rearwardly of said first reference plane, and means defining a receptacle mouth on the other side of said second reference plane between said back wall and said cover portion, the interior of said cover portion and said back wall portion defining an elongated chamber in said hood;
    a contact retainer receivable in said chamber, said contact retainer defining with said hood, an electric receptacle for a disposable flash array; and
    an underhousing of generally L-shaped cross-sectional configuration to present a pair of mutually perpendicular surfaces substantially at said first and second reference planes.

5. The apparatus recited in claim 4 including detent means projecting from said back wall of said hood to retain within said hood independently and by snap fit, said contact retainer and said underhousing, respectively.

6. The apparatus recited in claim 5, wherein the interior of said cover portion includes a pair of wall formations having free-standing edges spaced across said elongated chamber from and facing said back wall portion, said contact retainer being seated between said free-standing edges and said rear wall, and said detent means comprises a ledge formation projecting from said back wall portion to engage said contact retainer and to capture the same in said elongated cavity.

7. The apparatus recited in claim 4, wherein said hood includes a bracket formation depending from the underside of said cover portion, said bracket formation defining a pair of abutments facing and generally parallel to said back wall, said underhousing having a pair of sidewalls projecting from the one of said mutually perpendicular surfaces at said second reference plane, said sidewalls having end faces to engage said abutments, and wherein said detent means comprises a detent formation projecting from the juncture of said mutually perpendicular surfaces to engage a complementary formation in said back wall.

8. The apparatus recited in claim 4, including a ribbon-like cable extending from an end spaced forwardly of said first reference plane and retained in an L-shaped path by said underhousing.

9. A flash socket assembly comprising:
a plurality of generally U-shaped electrical contacts each having first and second end portions, each of said second end portions of said electrical contacts including an inclined tab;
a flexible cable;
a contact retainer of unitary molded construction having an opening therein for receiving at least the contact blade portion of a flash array, said retainer having a support surface positioned to support one side of the contact blade when the contact blade is operatively positioned within said opening, and means for effecting electrical contact between said second end portions of said U-shaped electrical contacts and a first end of said flexible cable, said electrical contact effecting means including a first internal surface of said retainer against which said second end portions of said U-shaped electrical contacts are seated and a second internal surface of said retainer disposed in facing relation to said first internal surface thereof and against which said first end of said flexible cable is resiliently engaged by said inclined tabs; and
a lower internal surface on said contact retainer against which said first end portions of said U-shaped electrical contacts are seated.

10. The assembly of claim 9 wherein said first internal surface has a plurality of slots spaced along the length thereof, and the central portion of each of said U-shaped electrical contacts includes a tine projecting beyond the second end portion and into one of said slots, so that said U-shaped electrical contacts are maintained in spaced relationship with one another.

11. A flash socket assembly comprising:
a contact retainer of unitary molded construction having an opening therein for receiving at least the contact blade portion of a flash array,
a substantially L-shaped hood to which said retainer is releasably attached, said L-shaped hood comprising a rear wall portion and a cover portion disposed at generally a right angle to each other and defining an elongated opening therebetween adapted to receive the contact blade portion of the flash array, said elongated opening being disposed in registry with said opening of said retainer, said rear wall portion having an end portion furthermost disposed from said opening of said hood configured to be pivotally connected to a camera; and
an actuator for placing the camera in an artificial illumination mode, said actuator being retained on said rear wall portion and adapted for displacement toward the distal end of said rear wall portion when a flash array is inserted in the contact retainer whereby a flash mode control member is automatically displaced by insertion of said array.

12. The assembly of claim 11 wherein the actuating means includes an elongated element having one end located in adjoining relation to the distal end of the rear wall portion and the other end having a yieldable contact arm adapted to engage the contact blade portion of a flash array.

13. A flash socket assembly comprising:
a plurality of generally U-shaped electrical contacts each having first and second end portions;
a flexible cable; and
a contact retainer of unitary molded construction having an opening therein for receiving at least the contact blade portion of a flash array, said retainer having a support surface positioned to support one side of the contact blade when the contact blade is operatively positioned within said opening, a rail formation positioned to internally support the central portion of each of said U-shaped electrical contacts so that said first end portions of said U-shaped electrical contacts are cantilevered therefrom to resiliently engage the contact blade against said support surface, means for effecting electrical contact between said second end portions of said U-shaped electrical contacts and a first end of said flexible cable, each of said second end portions of said electrical contacts including an inclined tab, said contact retainer including a first internal surface against which said second end portions of said U-shaped electrical contacts are seated, and said electrical contact effecting means includes a second internal surface of said retainer disposed in facing relation to said first internal surface thereof and against which said first end of said flexible cable is resiliently engaged by said inclined tabs.

14. The assembly of claim 13 wherein said first internal surface of said retainer faces towards said support surface thereof.

15. The assembly of claim 13 additionally including means for defining a surface configuration disposed on the opposite side of said central portions of said electrical contacts from said retainer rail formation to restrict the movement of said central portions of said electrical contacts away from said rail formation.

16. A flash socket assembly comprising:
plurality of generally U-shaped electrical contacts each having first and second end portions;
a flexible cable; and
a contact retainer of unitary molded construction having an opening therein for receiving at least the contact blade portion of a flash array, said retainer having a support surface positioned to support one side of the contact blade when the contact blade is operatively positioned within said opening, a rail formation positioned to internally support the central portion of each of said U-shaped electrical contacts so that said first end portions of said U-shaped electrical contacts are cantilevered therefrom to resiliently engage the contact blade against said support surface, means for effecting electrical contact between said second end portions of said U-shaped electrical contacts and a first end of said flexible cable, said assembly additionally including a substantially L-shaped hood to which said retainer is releasably attached, said L-shaped hood comprising a rear wall portion and a cover portion disposed at generally a right angle to each other and defining an elongated opening therebetween adapted to receive the contact blade portion of the flash array, said elongated opening being disposed in registry with said opening of said retainer, said rear wall portion having an end portion furthermost disposed from said opening of said hood configured to be pivotally connected to a camera, and said cover portion being configured to overlie and enclose said U-shaped electrical contacts.

17. The assembly of claim 16 wherein said cover portion is additionally configured to provide a cover over the lens of the camera when said assembly is pivoted to an inoperative position on the camera.

18. The assembly of claim 16 wherein said retainer is releasably attached to said hood in a snap-fit manner.

19. The assembly of claim 16 additionally including a generally L-shaped underhousing releasably attached thereto, said underhousing including a base wall extending in the general direction of said cover portion of said hood to cooperate therewith to enclose said retainer and a cable portion extending in the general direction of said rear wall portion of said hood, said flexible cable extending from said second end portion of said U-shaped electrical contacts between said base portion of said L-shaped underhousing and said retainer, then extending between said cable cover wall portion of said L-shaped underhousing and said rear wall portion of said hood in the direction of said end of said rear wall portion configured to be pivotally attached to the camera, the second end of said flexible cable extending from said assembly for connection to the camera.

20. The assembly of claim 19 wherein said L-shaped underhousing is releasably attached to the assembly of said retainer and said hood in a snap-fit manner.

21. A flash socket assembly comprising:
a plurality of generally U-shaped electrical contacts each having first and second end portions;
a flexible cable; and
a contact retainer of unitary molded construction having an opening therein for receiving at least the contact blade portion of a flash array, said retainer having a support surface positioned to support one side of the contact blade when the contact blade is operatively positioned within said opening, a rail formation positioned to internally support the central portion of each of said U-shaped electrical contacts closer to the second end portions than to the first end portions so that said first end portions of said U-shaped electrical contacts are cantilevered therefrom to resiliently engage the contact blade against said support surface, means for effecting electrical contact between said second end portions of said U-shaped electrical contacts and a first end of said flexible cable, said assembly additionally including a lower internal surface on said contact retainer against which said first end portion of said U-shaped electrical contacts are seated, and said lower internal surface including a plurality of ribs defining channels therebetween, the first end portion of each of said U-shaped electrical contacts being seated in a respective one of said channels.

22. The assembly of claim 21 additionally including a first internal surface against which said second end portions of said U-shaped electrical contacts are seated, said first internal surface being substantially parallel to said lower internal surface.

23. The assembly of claim 22 wherein said first internal surface has a plurality of slots spaced along the length thereof, and the central portion of each of said U-shaped electrical contacts includes a tine projecting beyond the second end portion and into one of said slots, so that said U-shaped electrical contacts are maintained in spaced relationship with one another.

24. The assembly of claim 22 wherein the slots have closed ends adjacent to said second end portions, and opposite open ends, each tine engaging a said closed end.

* * * * *